(12) United States Patent  
Farrell (10) Patent No.: US 7,415,944 B2  
(45) Date of Patent: Aug. 26, 2008

(54) HEAT EXCHANGER SUITABLE FOR A BOILER, AND A BOILER INCLUDING SUCH A HEAT EXCHANGER

(76) Inventor: Christopher Charles Farrell, c/o Unit 2, Broadley Park Road Industrial Estate, Rodborough, Plymouth, PL6 7EZ (GB)

( * ) Notice: Subject to any disclaimer, the term of this patent is extended or adjusted under 35 U.S.C. 154(b) by 341 days.

(21) Appl. No.: 11/272,430

(22) Filed: Nov. 10, 2005

(65) Prior Publication Data

US 2006/0144347 A1   Jul. 6, 2006

(30) Foreign Application Priority Data

Nov. 12, 2004  (GB) ................... 0425050.2  
Mar. 29, 2005  (GB) ................... 0506290.6

(51) Int. Cl.  
*F22D 1/02*  (2006.01)

(52) U.S. Cl. ..................... 122/20 B; 122/421

(58) Field of Classification Search ............... 122/15.1, 122/18.1, 20 B, 32, 33, 31.1, 421; 165/156, 165/163  
See application file for complete search history.

(56) References Cited

U.S. PATENT DOCUMENTS

| | | | |
|---|---|---|---|
| 4,541,410 A * | 9/1985 | Jatana .................... | 122/18.3 |
| 4,678,116 A * | 7/1987 | Krishnakumar et al. ... | 236/25 A |
| 4,690,102 A * | 9/1987 | Sundquist ................ | 202/166 |
| 4,751,913 A * | 6/1988 | Vetter .................... | 122/18.2 |
| 4,823,770 A * | 4/1989 | Loeffler ................. | 122/15.1 |

| | | |
|---|---|---|
| 2003/0056944 A1 | 3/2003 | Ferraro |

FOREIGN PATENT DOCUMENTS

| | | |
|---|---|---|
| DE | 3119855 A1 | 12/1982 |
| DE | 3401528 A1 | 7/1985 |
| DE | 3710743 A1 | 10/1988 |
| DE | 19837269 A1 | 2/2000 |
| EP | 0008568 A1 | 3/1980 |
| EP | 0053503 A2 | 6/1982 |
| EP | 0648981 A1 | 4/1995 |
| EP | 1039236 A2 | 9/2000 |
| EP | 1239236 A2 | 9/2002 |
| FR | 2546613 A1 | 11/1984 |
| GB | 1455750 A | 11/1976 |

(Continued)

OTHER PUBLICATIONS

International Search Report and Written Opinion of the International Searching Authority dated Jan. 24, 2006 for PCT/GB2005/004234.

(Continued)

*Primary Examiner*—Gregory A Wilson  
(74) *Attorney, Agent, or Firm*—Wolf, Greenfield & Sacks, P.C.

(57) ABSTRACT

A heat exchanger comprising: gas flow path means for defining a flow path for flue gases from a boiler; liquid flow path means for defining a flow path for a liquid through the heat exchanger; and heat transfer means for transferring heat from the gas in the gas flow path means to the liquid in the liquid flow path means, wherein the heat transfer means forms a first thermal store.

29 Claims, 9 Drawing Sheets

FOREIGN PATENT DOCUMENTS

| | | |
|---|---|---|
| GB | 2253031 A | 8/1992 |
| WO | WO 97/01072 A1 | 1/1997 |
| WO | WO 00/09948 A1 | 2/2000 |
| WO | WO 02/27247 A1 | 4/2002 |
| WO | WO 03/033970 A1 | 4/2003 |

OTHER PUBLICATIONS

British Patent Office Search Report dated Jun. 30, 2005 for priority document GB 0506290.6.

Combined Search and Examination Report dated Jul. 19 and 20, 2006 (respectively) from corresponding British Priority Application No. GB 0506290.6.

* cited by examiner

HEAT EXCHANGER SUITABLE FOR A BOILER, AND A BOILER INCLUDING SUCH A HEAT EXCHANGER

FIELD OF THE INVENTION

The present invention relates to a heat exchanger, and more particularly but not exclusively to a heat exchanger to be used in conjunction with condensing boilers, and non-condensing boilers.

BACKGROUND OF THE INVENTION

Boilers such as combination boilers are used in many homes to provide both heating and a source of instant hot water. Typically a hot water tank is dispensed with such that, when hot water is desired, cold water is drawn directly from the cold main and is passed through a heat exchanger within the boiler, the heat exchanger being directly heated by the burning of gas. The boiler only has a finite maximum power output and hence only this maximum power can be delivered into the water, less any thermal inefficiency within the boiler. Thus, the product of the flow rate of water through the boiler and the temperature rise occurring within the boiler is limited to a maximum value. In practice that means that turning the hot tap on for a fast flow might result in the delivery of warm, but not hot water and consequently to obtain hotter water the flow rate through the boiler must be reduced such that a larger temperature rise can obtained. Local climate has a significant effect on the water temperature of the cold water main. Seasonal variations within, for example, Great Britain may cause the cold water temperature to vary within a range of typically 5° C. to 20° C. Domestic boilers are generally designed to raise the cold main temperature by 35° C. at their nominal maximum flow rate. The maximum flow rate is often determined by a restrictor (often in the form of a plastic washer) within the cold water feed path to the boiler.

SUMMARY OF THE INVENTION

According to a first aspect of the present invention there is provided a heat exchanger, the heat exchanger comprising:
gas flow path means for defining a flow path for flue gases from the boiler;
liquid flow path means for defining a flow path for a liquid through the heat exchanger; and
heat transfer means for transferring heat from the gas in the gas flow path means to the liquid in the liquid flow path means, wherein the heat transfer means forms a first thermal store and comprises a vessel containing water and condensate from the flue gas can enter the vessel to replenish the water contained in the vessel.

It is thus possible to provide a combined heat exchanger and heat store. This is particularly useful in the context of a condensing boiler since, when the boiler is operating in a "central heating" mode waste heat from the flue gas can be used to warm the first thermal store up to the flue gas temperature. Typically this will be in the region of 50° C. or so. Under these conditions a boiler operates in a relatively efficient manner. However, when it is desired to provide hot water then the design criteria of the boiler is to output as much heat as possible. This generally requires the boiler to burn at its maximum rate. Whilst this creates a hot flue gas, the gas must quickly be removed from the boiler such that more unburnt gas and air mixture can be admitted into the combustion area. Therefore the very hot gas spends little time in contact with the primary heat exchanger within the boiler and is vented at a high temperature. The additional heat exchange provided by the present invention allows some of the heat recovered from the flue gas during the "central heating phase" to be used to pre-warm the cold water entering the boiler such that the boiler needs to work less hard to obtain a final output temperature and this can either allow a greater flow rate to be achieved or might allow the boiler gas flow to be reduced.

Preferably the boiler has a first water flow path for heating water for providing domestic hot water to taps, and a second water flow path which receives water returned from a radiator system and which heats the water for return to the radiator system. These paths are kept separate. For simplicity these paths can be thought of as "hot water" and "heating" paths respectively. Preferably the liquid flow path means is placed in series with the cold water inlet for the "hot water" path.

Preferably the heat exchanger is placed in the flue gas path of a condensing boiler.

As a further advantage, the heat exchanger of the present invention provides for a further phase of heat recovery from the hot flue gas exiting from the boiler when it is in "hot water" mode and some of this heat can be recovered and transferred to the cold water entering the boiler, thereby enabling either a higher flow rate and or an increase in hot water temperature whilst potentially reducing the gas required by a variable rate of between 5%-85% depending on variables of required flow, water temperature output and temperature rise required of the incoming cold water main. Where a higher flow rate is achieved at a given temperature it follows that for a given task, such as running a bath, the boiler will be operating for less time and hence less gas will be used. Thus the effective efficiency of the boiler is increased. Where the hot water demand is less, for example when running a shower, the boiler may be able to reduce the rate of fuel burn.

Preferably the heat transfer means comprises a vessel having at least one surface which either forms part of the gas flow path means or is in intimate contact with it. Preferably the vessel contains a material within it which acts as the first thermal store.

The use of water in the thermal store is particularly advantageous as water is readily available, inexpensive and generally considered to be safe. This water forms a self regulating store of condensate extracted from flue gasses and held in the primary heat exchanger vessel. The flue gasses contain approximately 19% water vapor as a result of the process of combustion and are in direct contact with the top of the thermal store and, where included, additional heat exchangers. Consequently the flue gasses are cooled to below dew point and the water therein condenses so as to form the material which acts at the primary constituent of the thermal store.

A heat exchanger constituting an embodiment of the present invention may be used with non-condensing boilers. Such boilers tend to have a higher temperature flue gasses than are found in condensing boilers. However, steps then need to be taken to prevent the first thermal store from getting too hot. In particular, where the thermal store contains water, then the thermal store must not be allowed to reach a temperature which would cause it to boil dry. This can be achieved by providing a cold air path into the heat exchanger, and providing a mechanism for controlling the rate of admission of cold air into the space surrounding the thermal store. In most cases a temperature controlled fan is used to control the rate of admission of cold air. However, in some instances where a good "draw" of air exists or a constant speed fan is used, then a valve arrangement, such as a butterfly valve or louvered slats, may be used to control the rate of admission. The air from the fan could mix with the flue gasses, or alternatively, a separate air flow path could be provided such that operation of the fan does not affect the boiler. In such an arrangement a safety cut out is provided in order to stop the boiler if the fan fails.

The heat exchanger of the present invention can be used with boilers fuelled by gas, oil or less traditional fuels such as bio-mass.

Preferably the heat capacity of the thermal store is selected to be a function of the maximum power output of the boiler.

Preferably the heat capacity of the first thermal store lies above a first threshold value which is proportional to the power output of the boiler. This is advantageous since, the flow rate of water through the boiler in the "hot water" mode tends to be proportional to the boiler output and hence too small a thermal store would result in its temperature being reduced to the cold main temperature very quickly and hence the contribution from the thermal store to raising the cold water temperature being supplied to the boiler would be negligible and/or quickly exhausted.

In general it is desirable that the thermal store should exceed temperatures of 45° C. regularly so as to inhibit the growth of legionella. However, in installations where the boiler is nearly always on (i.e. nursing homes and commercial premises where the heating is constantly on) then it is desirable, to reconfigure the dimensions and relative sizes of the heat store and cold water pipe in the heat store such that the temperature in the heat store does not rise above 25° C. In such an arrangement the heat exchanger still receives useful heat. This lower temperature regime again prevents the build up of legionella.

Preferably the heat capacity of the first thermal store lies below a second threshold value which is proportional to the power output from the boiler. This is advantageous since, starting a boiler from cold, it is desirable that the thermal store should reach a given temperature, of approximately 50° C., within a predetermined time, typically ½ hour to 1 hour. Too large a thermal store would mean that a temperature rise within the thermal store would be very very slow.

Domestic hot water use within a home tends to be for short periods. Even filling a bath takes only a few minutes and even then there is often a mix of hot and cold water. At 12 liters per minute a user would fill a bath of 55 liters in less than 5 minutes. Whilst showers may have a longer running period, the flow rate is typically only 6 liters per minute. It is therefore preferable that the thermal store is sized such that it continues to provide sustained heat to the water entering the boiler for the period of required hot water with significant benefit during the first 5 minutes and a sustained improvement to either the temperature rise of the output hot water from the boiler or significantly reduced energy consumption depending on flow rates and temperature settings.

Advantageously the vessel forming the heat transfer means is in the form of a hollow vessel and the gas flow path means causes the hot flue gas to flow over both an internal and external surface of the vessel. Advantageously an uppermost portion of the vessel may be concave so as to form a reservoir region into which condensate from the flue gas can collect. Advantageously the reservoir is punctured such that condensate captured therein can flow into the interior of the vessel thereby ensuring that water contained within the vessel is topped up during use of the boiler.

Advantageously the vessel forming the heat transfer means may have one or more apertures formed in it. The apertures may be formed in the inner and outer walls of the vessel such that gas may pass through the vessel. The positioning of the apertures determines the maximum volume of water that can be contained within the thermal store. This enables a single size of vessel to be used with different boiler types, and the size of the thermal store to be adapted to each boiler merely by placement of the holes. Alternatively an upstanding pipe may form a drain which is used to determine the volume of water in the vessel.

Advantageously a second thermal store is located in or adjacent the heat exchanger, and in a preferred embodiment is formed by a further container generally coaxially disposed within the internal duct of the transfer means. Advantageously this second thermal store is formed by an open top container into which condensate from the gas flue gas can collect. This provides an inexpensive method of defining a second thermal store which is in thermal exchange with the first thermal store via a gas interface formed of the flue gases.

Alternatively the second thermal store may be replaced by a further heat exchanger which, in one embodiment of the invention, is formed by a section of cold water pipe being disposed within the flue gas path.

The heat exchanger is advantageously placed adjacent and next to the boiler or internally disposed within a casing of the boiler. In a domestic installation this can be achieved by installing the device just above the boiler since, typically, the flue gas is exhausted from the top of the boiler. However, it is also possible to install the heat exchanger more remotely, for example on the outside wall of a dwelling, provided that steps are taken to insulate it so as to prevent the water pipes from freezing.

It is also possible to add a further "coil" (water path) within the heat exchanger for the flow of water in the "heating" path to recover some heat from the flue gas.

A particular benefit of using a heat exchanger of this type is the reduction in "pluming" of the boiler exhaust gas. Generally, on cold days and particularly when there is little or no wind, the moisture in the exhaust gas condenses into very small water particles in the vicinity of the flue gas outlet. This creates a local mist/smog which is visually undesirable and which may also contain contaminants from the combustion process. The use of the present invention significantly reduces pluming because the flue gas is cooled within the heat exchanger sufficiently to cause condensation to occur within the heat exchanger. The condensate can drain back into the boiler and flow along the condensate drain path provided within the boiler.

Advantageously the heat exchanger components which are in contact with the flue gasses are formed of aluminium or stainless steel, which offer resistance to the corrosive effects of the flue gas.

Preferably the warmed water returned from the heat exchanger is mixed with cold water from the cold water main prior to admission into the boiler. The mixing valve may be thermostatically controlled. This can ensure that the water entering the boiler is reduced to a temperature of below 30° C. This is advantageous as tests indicate that many boilers will not fire up if the inlet water is above 30° C.

Optionally the heat exchanger may be provided as a distributed device. In such an arrangement two vessels may be provided for holding the thermal store. A first vessel may be positioned such that it is in contact with the hot flue gasses such that some of water/flue gas condensate within the first vessel gets warmed by the flue gas. The condensate may then be pumped into a second vessel where a second volume of warmed condensate can give its heat up to liquid in the liquid flow path.

Advantageously a pump, for example a temperature controlled pump is provided to control the circulation of condensate from the second vessel to the first vessel and back again.

Advantageously the condensate being delivered to the first vessel passes through a heat exchange device, such as a coiled or meandering pipe, or is caused to run over the surface of a plate which has a heat exchange surface in contact with the flue gas.

BRIEF DESCRIPTION OF THE FIGURES

Embodiments of the present invention will further be described, by way of example, with reference to the accompanying drawings, in which.

DESCRIPTION OF PREFERRED EMBODIMENTS

Generally UK heating installations rely on hot water to be supplied to "radiators" which in fact facilitate the formation of convection currents within a room so as to transfer heat into the room. In order for a condensing boiler to work in a condensing mode the water temperature in the return line must be at sufficiently low a temperature for condensation from the flue gas to occur. Boiler manufacturers typically choose to specify their boiler efficiencies at an outflow temperature of 50° C. and a return temperature of 30° C., primarily because this is an efficient temperature range over which to operate the boiler.

However boilers are less efficient when not operating in a condensing mode, as is the case when providing hot water. However the efficiency of the boiler can be increased by the provision of a secondary heat exchanger.

Figure 1:
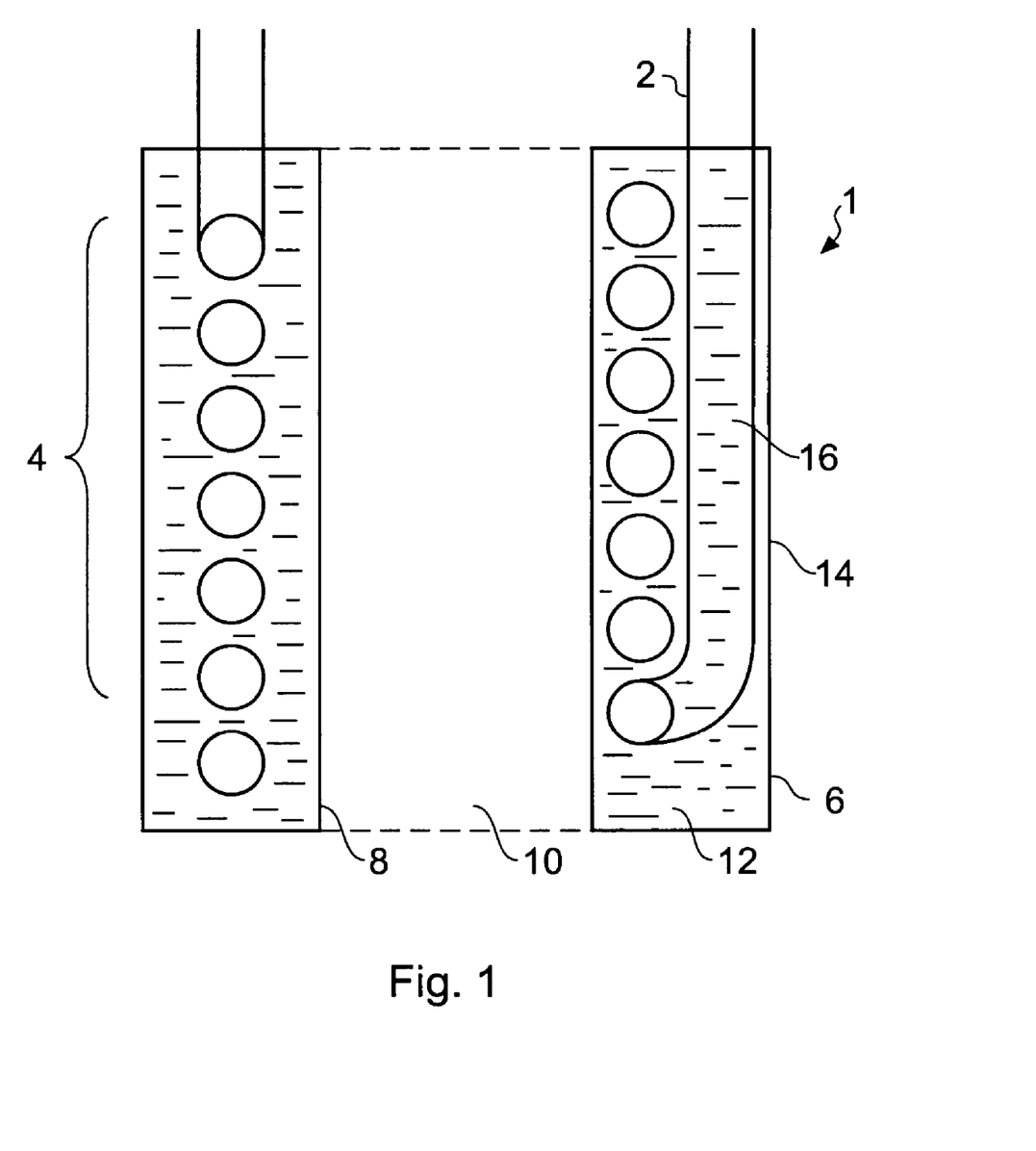
FIG. 1 schematically illustrates a heat exchanger constituting a first embodiment of the present invention.

FIG. 1 schematically illustrates a heat exchanger constituting a first embodiment of the present invention and generally designated 1. The heat exchanger comprises a cold water pipe 2 which is bent into a helical coil portion 4 so as to provide a large pipe surface area within a compact volume. The helical portion 4 of the pipe is disposed within a double walled vessel 6. An inner wall 8 of the double walled vessel 6 defines a channel 10 which is open at both ends and through which hot gas flue gases can flow. A volume 12 defined between the inner wall 8 and an outer wall 14 of the double walled vessel 6 is filled with water 16 so as to form a thermal store.

Thus, comparing this heat exchanger with a conventional heat exchanger design rather than the helical portion 14 being directly placed into the gas flow path 10, the helical portion 4 is instead placed in a fluid reservoir, where the fluid is heated by gas passing through the gas flow path 10. This means that, compared to a normal heat exchanger, the heat capacity of this heat exchanger is much greater.

The top of the heat exchanger is open such that water derived from the condensate from the flue gas can enter into the heat exchanger. Keeping the heat exchanger open to the atmosphere has the advantage that its internal pressure is always at atmospheric pressure thereby removing any risk of rupture associated with pressure in closed vessels.

Figure 2:
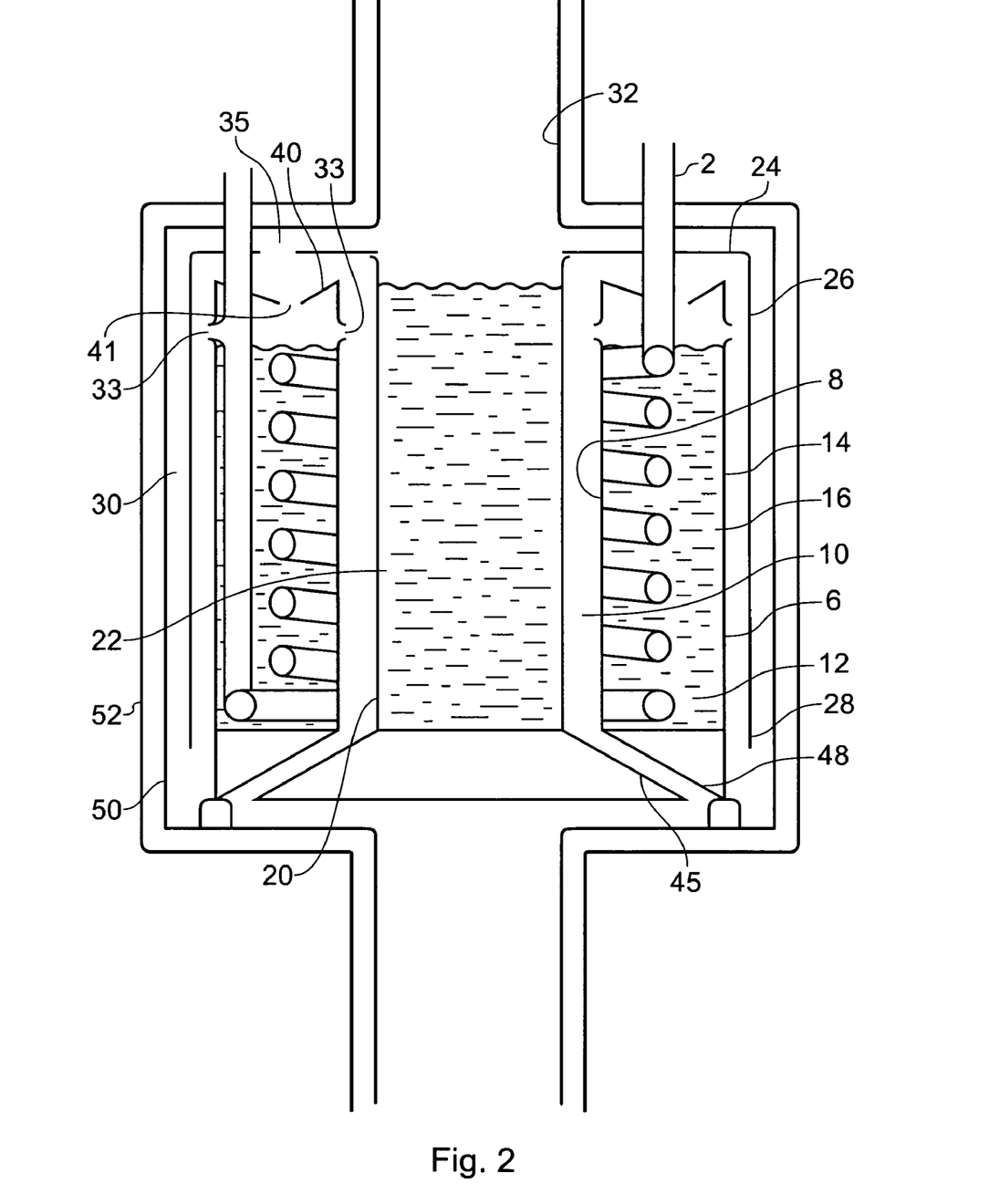
FIG. 2 schematically illustrates a heat exchanger constituting a second embodiment of the present invention.

FIG. 2 schematically illustrates a further heat exchanger which includes within it a heat exchanger of the type illustrated in FIG. 1. For convenience, like parts will be designated with like references. However additional components are included within this heat exchanger and in particular a reservoir 20 having a closed lower end is coaxially disposed within the gas flow path. The reservoir 20 contains water 22 and hence the hot flue gases flowing along the channel 10 now give out the heat to both the water 16 enclosed within the double walled vessel 6 and also the water 22 enclosed within the reservoir 20. A flange 24 extends radially outwards from the top of the reservoir 20 passing over the upper surface of the vessel 6 and joining with a further wall 26 which envelopes the exterior wall 14 of the vessel 6. The flange 24 and wall 26 serve to define a further gas flow path which now cause the hot flue gases from the boiler to travel over the top of the vessel 6 and then down the outside of the vessel 6 thereby giving further heat exchange possibilities. Once the gases reach the bottom most edge 28 of the wall 26 they are then allowed to enter into a further flue gas channel 30 which ducts the gases towards an exit pipe 32 of the heat exchanger.

Optionally apertures 33 can be formed in the walls 8 and 14 of the vessel 6. These allow the maximum level of water within the vessel 6 to be defined if, for a given boiler, it is desirable to have the amount of water reduced compared to the maximum volume of the vessel 6. Similarly apertures could be formed in the reservoir 20 to limit its maximum volume of water.

As the flue gases pass over the surfaces of the heat exchanger, the gas is cooled. This can give rise to the formation of condensation within the heat exchanger, and the point that this starts to form will vary depending on operating parameters of the boiler, external temperature, water temperature and so on. This condensation can be used to advantage. The vessel 6 is provided with an uppermost wall 40 which is dished so as to form a collecting region, and apertures are formed in the dished wall 40 to allow condensation which collects on the wall 40 to flow into the interior of the vessel 6 thereby ensuring that the vessel 6 remains topped up with water whilst also allowing the vessel to remain vented, thereby avoiding any potential dangers from pressure build up should excessive heating occur. Similarly condensation occurring within the outlet pipe 32 can fall under gravity into the interior of the reservoir 20 thereby topping up the water 22 ensuring that that secondary thermal store also remains continuously full.

Optionally, a diffuser may be provided in the inlet gas path from the boiler so as to ensure that the gas is equally distributed over the interior wall 8 of the vessel 6. The diffuser may be formed by an inclined wall 45 which may extend from or at least be in contact with the bottom surface of the reservoir 20. The vessel 6 may have its profile altered in order to form co-operating surfaces 48 thereby further enhancing heat transfer into the heat exchanger by virtue of heat flow across the surface 48. In an alternative embodiment the vessel 6 may rest upon a profiled ring which is chamfered so as to define the surface 48. The heat exchanger is enclosed within a housing 50 which itself may be further enclosed within a second housing 52 with the gap between the housing 50 and 52 defining an air inlet path for gases to the boiler, thereby ensuring that air admitted into the boiler for combustion is itself pre-warmed further enhancing the efficiency of the boiler, and also ensuring that the exterior surface of the heat exchanger remains cool, for example to the touch, since the boiler will be installed in a domestic environment.

As noted hereinbefore combination boilers, can operate in a hot water mode or heating mode. In the heating mode the boiler can operate in a "condensing mode" keeping the flue gas temperature from the boiler below 58° C. The boiler is most efficient in this mode of operation. However, when the boiler is operating in its hot water mode it must maintain its target domestic hot water temperature and rate, and this causes the boiler to work in its less efficient range where the flue gas temperature exceeds 58° C. and hence the boiler is no longer able to operate in a condensing mode. Typically the flue gas temperature of the boiler will rise to between 45 C to 75 C when in hot water mode for combination boilers and 85 C for system boilers depending on sophistication levels of electronic energy optimizing controls.

The power output of a boiler is typically described in terms of kWh. A boiler typically burns 1 m$^3$ of gas per 10.5 kWh and, for each 1 m$^3$ of gas will need to consume 10 m$^3$ of air. Therefore a condensing boiler capable of modulating its gas flow and operating in the 8 to 30 kWh range will produce between approximately 8,800 liters of flue gas and 33,000 liters of flue gas every hour, with the flue gas having a temperature typically between 55° C. and 85° C., depending on boiler type and installation requirements.

The amount of heat lost through the flue gas is difficult to quantify but we know that for specific heat capacity of dry air is approximately 1 kJ per kg. Furthermore, one mole of gas (approximately 18 gm in the case of air) occupies 22.4 liters (Avagadro's constant at stp).

Therefore 31,000 liters of gas equates to approximately 1,400 mole of gas, which is approximately 25 kg. Thus 25 kJ per hour could potentially be recovered from the exhaust gas for each 1° drop in the temperature of the flue gas. In practice, these figures underestimate the heat available as the flue gas will, by definition, be moist and water has a much higher specific heat capacity. An 8-30 kWh boiler produces between 1.6 m$^3$ and 6 m$^3$ of water vapour per hour of operation.

Typically, in a domestic situation, the boilers are either switched off over night and timed to come on early in the morning, or may run continuously over night. In any event, it is reasonable to assume that the boiler will spend at least ½ hour if not 1 hour, in the central heating mode prior to occupants of the house getting up and wishing to draw hot water. In this time, the exhaust gas from a flue can warm the or each, i.e. the first and second, thermal stores up to the exhaust gas temperature, which will typically be between 58° C. and 85° C. depending on boiler type and installation. Once the occupants of the house get up, they will typically require relatively small volumes of hot water for activities such as filling a basin. When the hot tap is operated, the boiler will initially receive water which has been trapped in the helical section of the pipe 2, and this water is already heated to 60° or so. Therefore, for small volumes of water the boiler may not need to fire or as will be described later in relation to a system having a mixing valve for mixing water from the cold main with water from the heat exchanger, will only fire at its lowest operating rate due to the mixing of warm water with that coming from the cold main. As more water is drawn, the cold water flowing through the pipe 2 can pick up significant amounts of pre-warming from the water contained within the vessel 6. Thus, the boiler may only be required to produce a relatively modest temperature rise in order to obtain its hot water target output temperature. Such a relatively modest temperature may be obtainable by modulating the gas flow down to a relatively low value such that the boiler is more efficient because either it is still operating in condensing mode or alternatively simply because the warm gas does not have to be evacuated from the boiler so quickly and hence can spend a greater time in contact with the primary heat exchanger provided within the boiler giving up its heat to warm the water prior to being evacuated through the boiler flue. That gas can pass through the secondary heat exchanger constituting an embodiment of the present invention and give up some of its heat within the heat exchanger to re-warm the thermal mass.

Given that the boiler may be started from cold, it is clearly desirable for the thermal store to be able to reach its maximum temperature within say ½ hour to 1 hour of the boiler being started. Therefore the heat capacity of the thermal store should not be too large compared to the output of the boiler. Experimentation by the applicant suggests that the thermal stores, when using water should have a volume, when taken together of between 0.25 and 0.5 liter per kWh output of the boiler. This is in conformity with the general requirement for a domestic boiler to be able to provide approximately 14 liters of water per minute. If the boiler is run for a long time in the hot water mode, a steady state condition will be reached whereby the temperature of the thermal stores of the secondary heat exchanger becomes stable because heat transfer from the hot flue gas to the thermal stores equals the rate of heat transfer from the thermal stores to the incoming cold water. Under these conditions the heat exchanger can typically provide a 5° C. to 10° C. rise in the domestic cold main water temperature, depending on flow rate of the water.

In an embodiment of the invention the housing 50 is cuboid and has a height of 300 mm, a width of 430 mm and a depth of 270 mm.

The vessel 6 has a height of 275 mm, a width of 410 mm and a depth of 250 mm, with an internal flue having a width of 250 mm and a depth of around 100 mm. The sloping region 48 has a height of around 25 mm.

The flange 24 has a width of 420 mm and a depth of 260 mm, and the wall 26 has a height of 280 mm.

The outer causing 52 has a height of 310 mm, a width of 310 mm, a width of 440 mm and a depth of 280 mm.

It will be appreciated that different design criteria may be applied to the thermal store depending on the particular boiler installation. However, in the context of the domestic arrangement the use for approximately 0.25 to 0.5 liters of water within the thermal stores for each kWh of the boiler means that, each day, after approximately ½ to 1 hour of running the boiler in the "domestic heating" mode the water temperature within the thermal store and within the helical portion of the cold water pipe will have risen sufficiently to inactivate any legionella bacteria which might be seeking to grow within that pipe. Similarly the thermal store is sufficiently small that the process of running a bath will cause it to become depleted and hence the temperature within it will drop to approximately to the cold main temperature, again causing the legionella bacteria to be rendered inactive, this time by virtue of the temperature dropping to below the temperature range that the bacteria lives in. This is advantageous if there is a risk that occupants of the house may either choose to drink from the hot water tap or that the use of mixing valves, for examples in showers, could potentially cause reverse flow within the pipe 4, although this is unlikely since it will be connected in most instances to the cold water main, although reverse flow might be possible if water was provided from a cold water header tank.

Figure 3A:
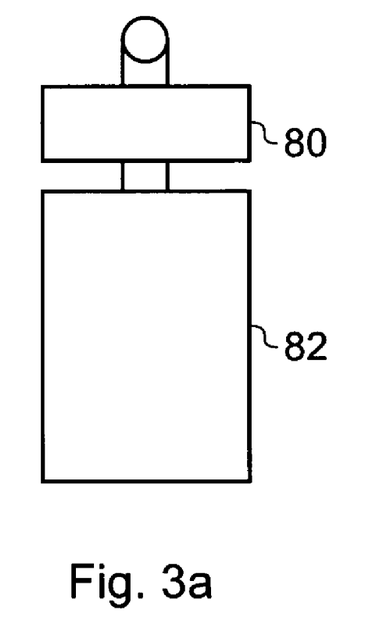
FIG. 3a and FIG. 3b schematically illustrate alternative combinations of condensing boilers fitted with heat exchangers constituting embodiments of the present invention.
Figure 3B:
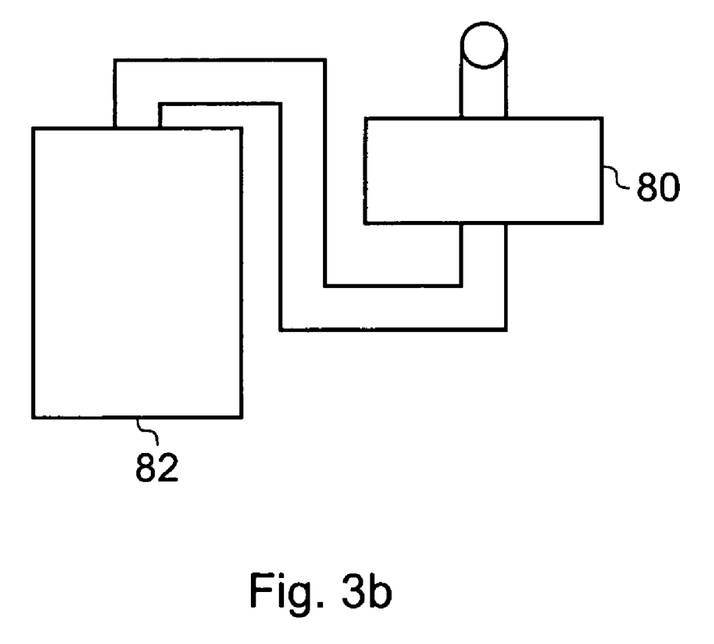

It is thus possible to provide a simple and relatively inexpensive secondary heat exchanger which can significantly reduce the gas consumption of a condensing boiler. The secondary heat exchanger is relatively compact, and, as shown in FIG. 3a, the heat exchanger 80 could either be mounted directly above the boiler 82 or, as shown in FIG. 3b the heat exchanger may be mounted to the side of the boiler 82 thereby enabling both of these components to fit within the vertical space that is commonly found between a kitchen worktop and a kitchen ceiling. Indeed, the size of the active components within the boiler can be reduced sufficiently to allow the heat exchanger to be fitted within the space within the boiler's casing.

The present invention also has the benefit of reducing localised pollution. Boilers often emit a "plume" from their flue. This is noticeable as a white fog near the flue. The plume often contains low levels of sulphurous gases as a result of the combustion of gas. However, within the heating systems fitted with a secondary heat exchanger constituting an embodiment of the present invention, pluming is reduced since condensate is captured within the heat exchanger and hence pluming is less likely to occur—except when the thermal store and the flue gas are at steady state temperatures.

The contaminated water is eventually discarded via the boiler drain when more condensate is collected.

The heat exchanger can also be used with "system boilers" where a "water to water" plate heat exchanger, or alternatively an indirect cylinder is used to generate hot water via an indirect heating coil within the cylinder and where the incoming cold water is fed directly into the cylinder. Here the water fed into the cylinder passes through the heat exchanger prior to entering the cylinder. These cylinders are rated by their storage capacity and recovery time, that is the time taken to heat water within the cylinder from 5° C. to 60° C. The present invention decreases the recovery time of the cylinder, and this allows smaller cylinders to be used.

The heat exchanger shown in FIG. 2 may optionally have apertures 35 formed in the flange 24 to allow for gas escape in case the boiler's gas valve lets some gas flow continue when in the closed position. These apertures are small in area, and may be formed of 3 holes each of, say, 3 mm diameter.

Furthermore a heat source, such as an electric heating, coil might be provided within vessel 6 and periodically energised to ensure that the water temperature rises sufficiently to kill any legionella bacteria in the heat exchanger.

Figure 4:
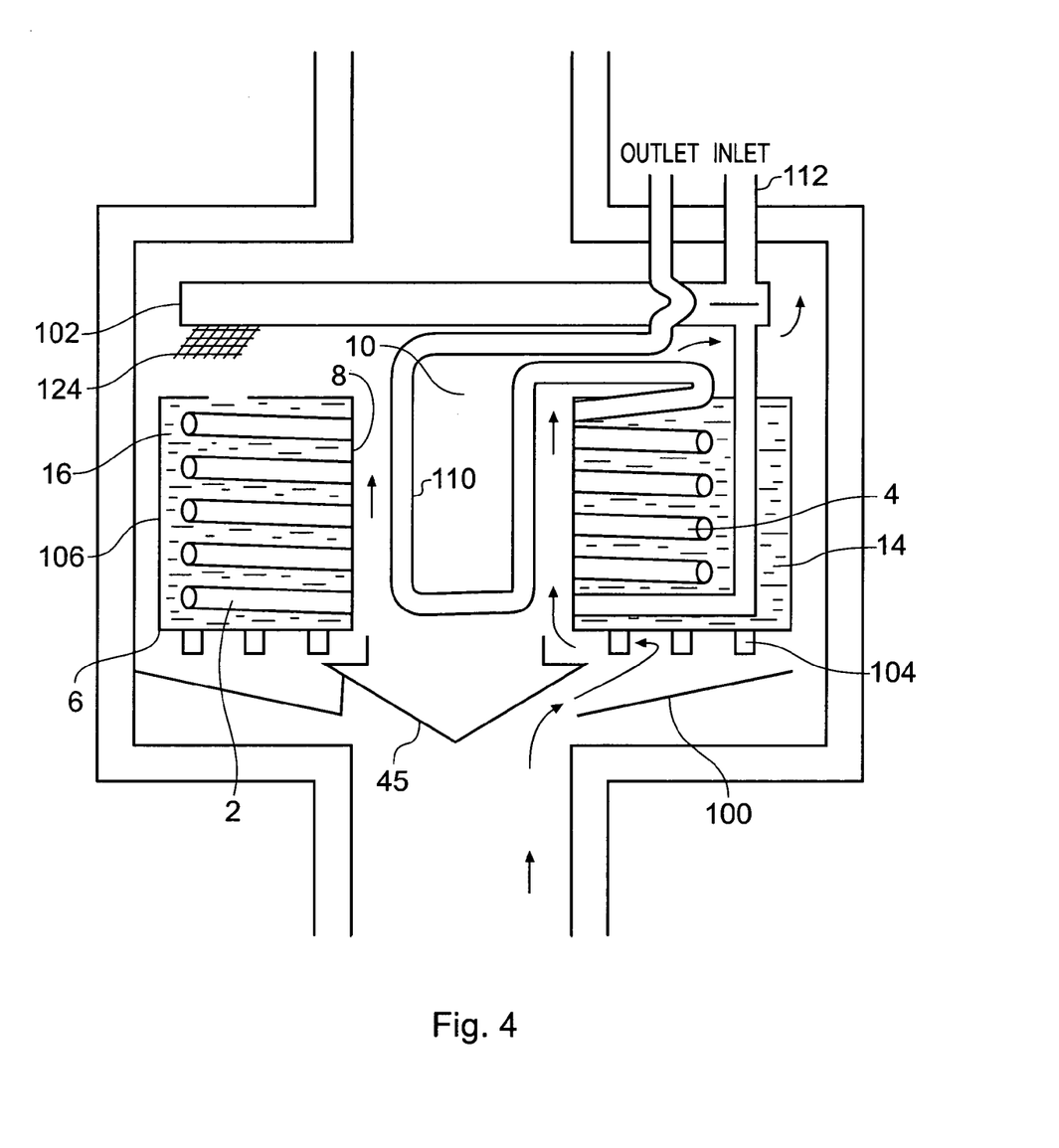
FIG. 4 is a schematic cross-section through a heat exchanger constituting a further embodiment of the present invention.

FIG. 4 schematically illustrates a further heat exchanger design constituting an embodiment of the present invention. As before a cold water pipe 2 is bent so as to form a helical coil 4 disposed in water 16 held within a vessel 6 which has an inner wall 8 defining a channel 10 through which hot flue gases can flow from the boiler. This arrangement forms a "primary" heat exchange 114. A diffuser 45 is provided in the entrance path to the channel 10 so as to alter the flow path of the gas. The diffuser 45 may be attached by relatively thin supports (so as to define gaps through which the gas can pass) to the wall 8, or it may rest on supports provided on a drain plate 100 (as shown in FIG. 4) or it may be mounted on an arm or other support extending from the upper heat exchanger 102. The vessel 6 may carry or be in contact with heat exchange fins 104 which are shown as being on the lower surface of the vessel but equally could be formed on the inner wall 8 or the outer wall 106 of the vessel. In such circumstances a gas path can also be provided around the exterior wall of the vessel 6.

Additional heat exchange opportunities are provided by the upper heat exchanger 102 and a further heat exchanger 110. The upper heat exchanger 102 is a plate heat exchanger and is provided between the cold water inlet 112 and the "primary" heat exchanger 114 provided by the coil 4 immersed in the water contained within the vessel 6.

Figure 5:
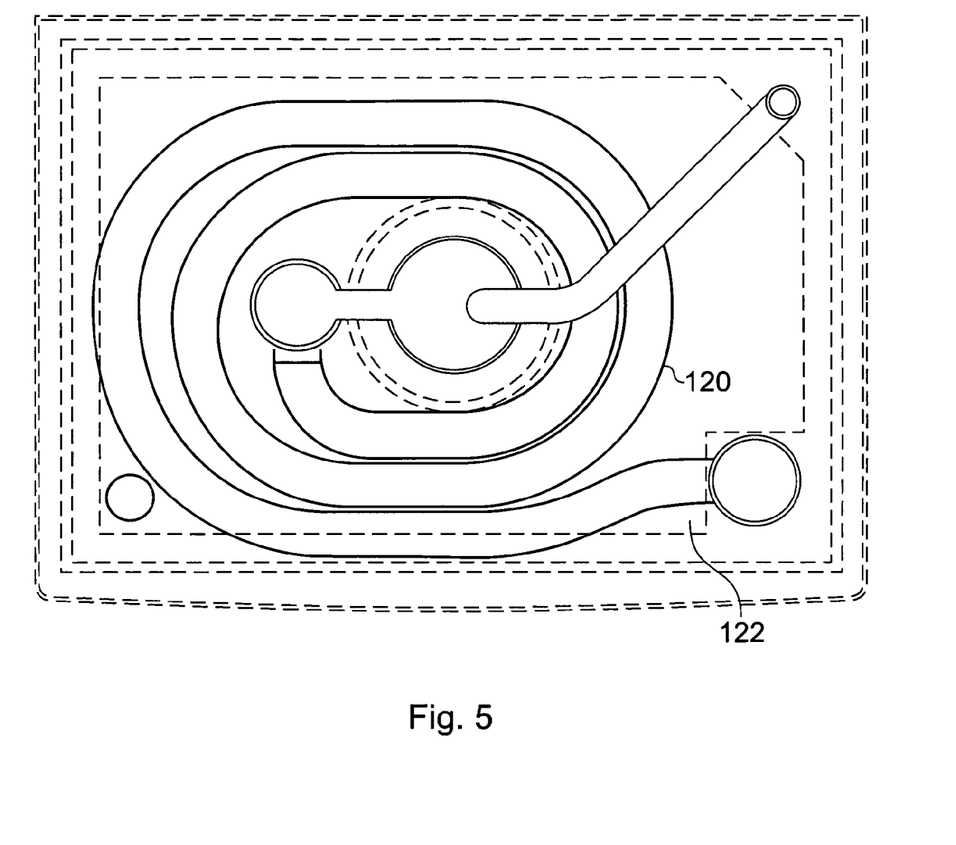
FIG. 5 shows the upper heat exchanger of FIG. 4 in greater detail.

The plate heat exchanger 102 could be in the form of a closed box having internal baffles to define a water flow path within the box. Alternatively, as shown in FIG. 5 the plate heat exchanger may have a coiled water carrying pipe 120 in intimate thermal contact with a plate 122 so as to pick up heat from the plate 122. In order to improve heat conduction from the flue gas to the plate heat exchanger 102 the plate heat exchanger may carry a wire mesh, of which only a small portion 124 is shown, that extends into the flue gas path.

A third heat exchange opportunity may be provided by a portion 110 of water carrying pipe disposed within the channel 10. This can be thought of acting as a tertiary heat exchanger.

In use, the gas from the boiler flows into the heat exchanger, the gas is hottest in the vicinity of the heat exchange fins 104 and in the central portion of the channel 10. Therefore the hottest gas passes over the tertiary heat exchanger 110 and after heat exchange, the coldest gas passes over the upper heat exchanger 102. It follows that the cold water path should be such that cold water from the mains inlet should first pass through the upper heat exchanger 102, then through the primary heat exchanger and finally through the tertiary heat exchanger formed by the pipe 110.

It is useful to consider the comparative benefits of fitting the heat exchanger of the type shown in FIG. 4 to a commercially available domestic boiler.

Tests were performed with a heat exchanger in which the primary heat exchanger contained 7.5 m of pipe having an internal diameter of 20 mm and an external diameter of 28.8 mm.

The top heat exchanger had a flow path of 600 mm formed by a baffled section within a hollow box. The tertiary heat exchanger had flow paths of 15 mm in the individual arms thereof.

The heat exchanger occupied a volume that was defined by a case having external dimensions of 400 mm width, 313 mm height and 285 mm depth.

Figure 6:
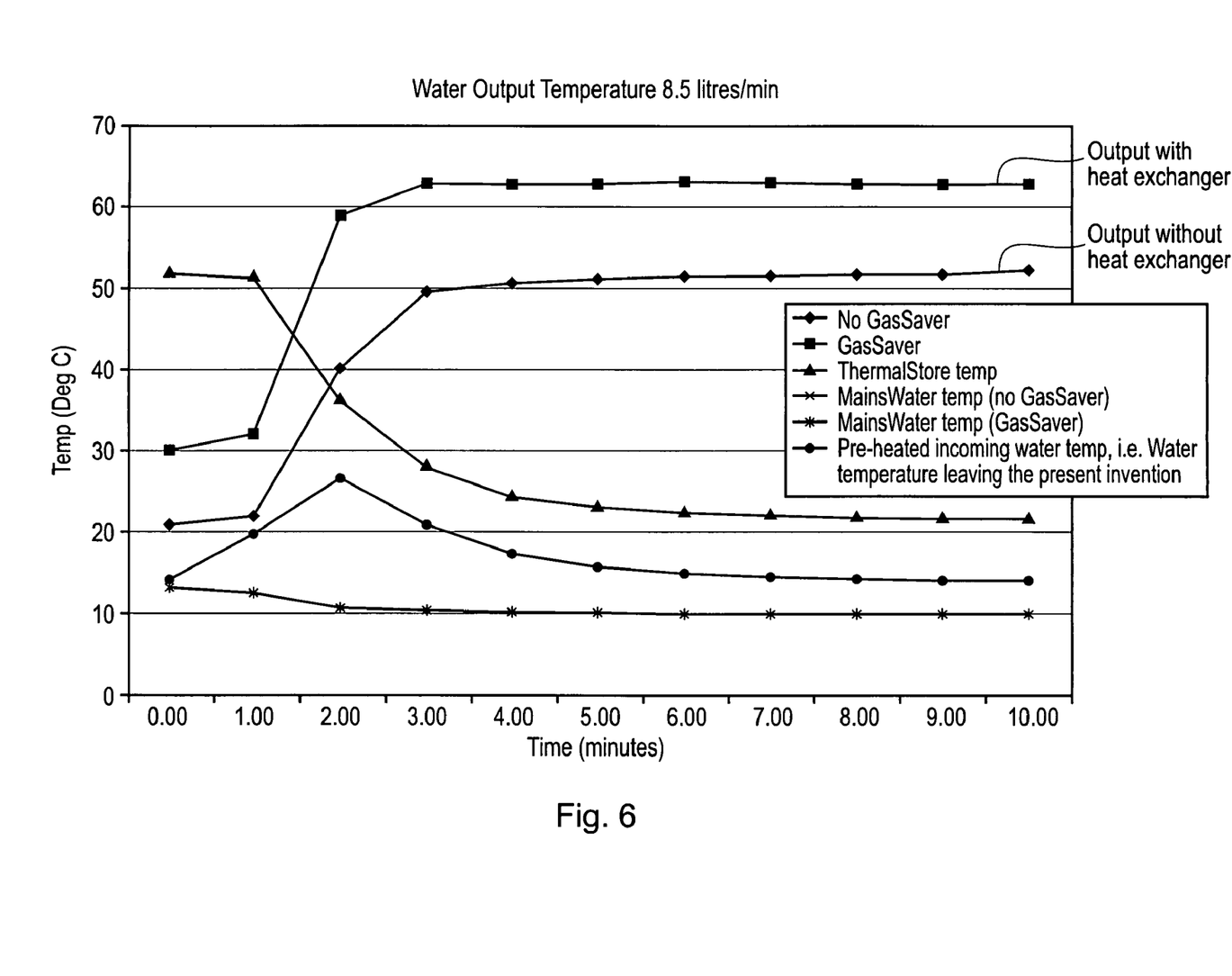
FIG. 6 shows some test results for the present invention.

FIG. 6 shows data for the heat exchanger when fitted to a "Glow Worm 30 cxi" boiler.

In FIG. 6, the boiler had initially been working in central heating mode, so the thermal store temperature had risen to around 52° C. Once hot water was drawn, the water in the thermal store had already been partially warmed, as indicated by water in the first minute being delivered at between 30° C. and 32° C., as opposed to being delivered at between 20° C. and 22° C. without the heat exchanger being present. It can be seen that, at the flow rate of 8.5 liters/minute the ultimate hot water temperature achieved was 62° C. as opposed to 53° C. without the present invention.

In real terms, if the water from the boiler was used to run a bath, the energy used for a typical "warm" bath would be reduced by between 30 to 85%. Similarly for small deliveries of warm water at around 30° C. to 40° C., for example running water for a wash basin or use by a washing machine, the boiler might not need to fire at all. In tests at water flow rates of 5 liters per minute the heat exchanger saves between 55 and 85% of gas consumption over a 10 minute period depending on the rate of water draw.

Figure 7:
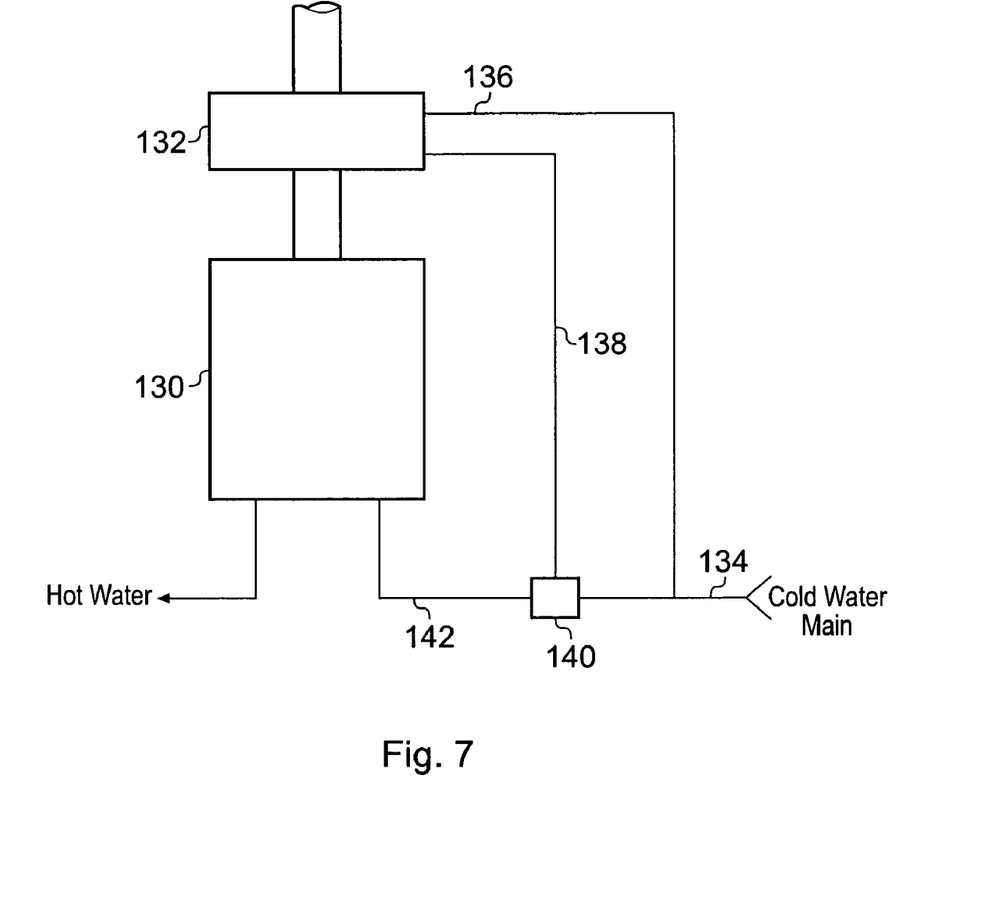
FIG. 7 schematically illustrates the flow path for water for a boiler having a heat exchanger according to the present invention.

FIG. 7 schematically illustrates the cold water flow to a boiler 130 fitted with a heat exchanger 132 constituting an embodiment of the present invention. Water from the cold water main 134 is admitted into the heat exchanger 132 via an inlet path 136. Warmed water from the heat exchanger 132 exits along an outlet path 138 and is blended with water from the cold water main 134 by a blend valve 140 before being supplied to the cold water inlet 142 of the boiler 130. The blend valve 140 may be temperature controlled. This has the advantage that, irrespective of the flow rate, the water admitted to the cold water inlet of the boiler 130 can be held below 30° C. This is advantageous because some boilers will not fire if the cold water feed to them is above 30° C. Furthermore, the minimum rate of burn on a boiler may be such that, under certain circumstances the water outlet temperature would become too warm if water drawn through the heat exchanger 132 was not mixed with cold water from the cold water main 134. This reduction in the flow rate through the heat exchanger has the additional benefit that it takes longer to exhaust the store of heat within the heat exchanger.

Figure 8:
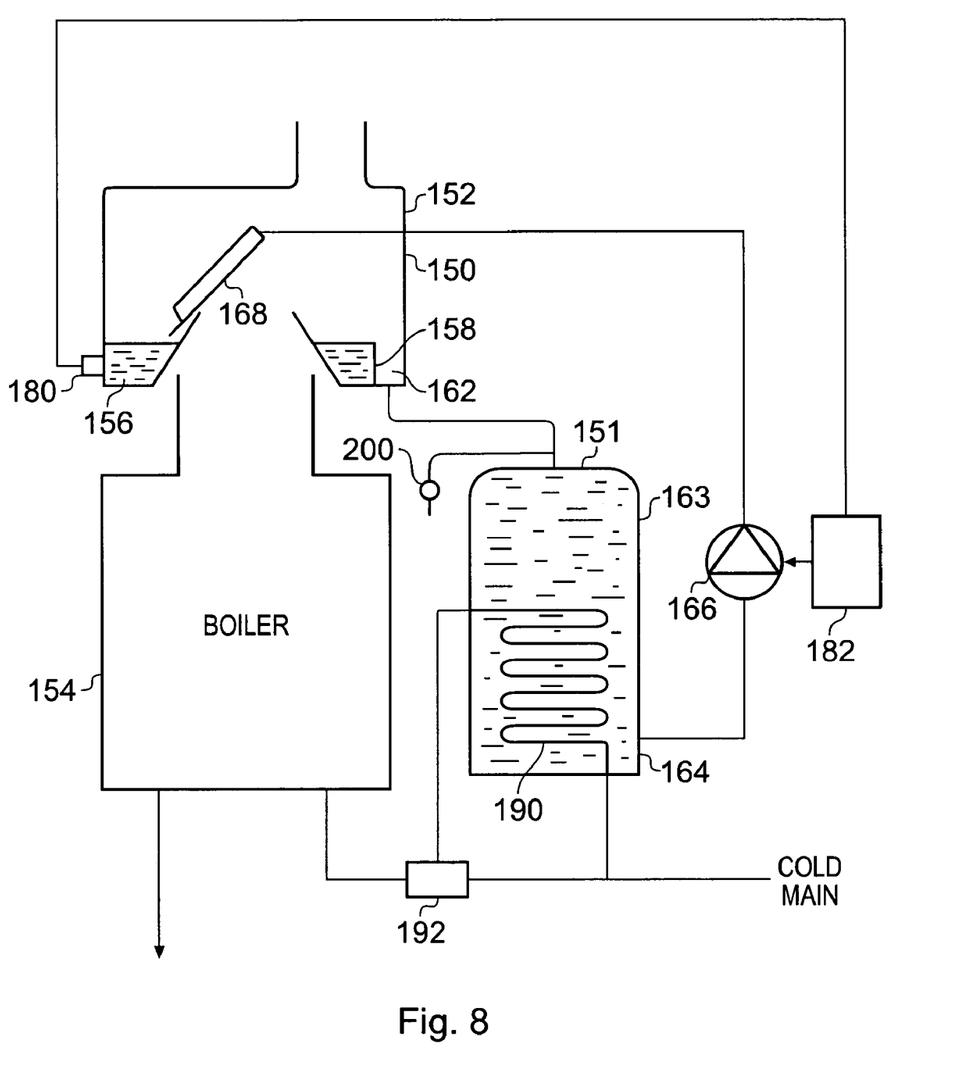
FIG. 8 schematically illustrates a distributed heat exchanger constituting an embodiment of the present invention.

FIG. 8 shows a further embodiment of the present invention in which the heat exchanger is distributed into two parts, 150 and 151. In this arrangement the first part comprises a vessel 152 which defines a gas flow path from a boiler 154 therethrough. The vessel 152 acts to collect condensate 156 from the flue gasses and to hold it in an internal reservoir. An internal weir 158 is provided so as to control the level of condensate within the vessel 152. The "downstream" side of the weir 162 is connected to the second part of the heat exchanger, which is constituted by a second storage vessel 163 so as to admit warmed condensate into it. The second storage vessel 163 has an outlet 164 which is connected to an inlet of a pump 166 which can be used to pump condensate from the vessel 163 back to the first vessel 152. The pumped condensate passes through a further heat exchanger 168 where it is warmed before being vented into the vessel 152. In this way the vessel 152 is only required to form a store or reservoir to hold a small proportion of the total volume of the condensate. The remainder of the condensate is in the second storage vessel 163 and the exchange of condensate between the first vessel 152 and the second vessel 163 is controlled by the pump 166. Thus, once the pump is activated the fluid level within the vessel 152 rises until such time as the condensate overflows the weir 158 and that condensate is then returned to the vessel 163. A temperature sensor 180 in conjunction with the controller 182 may be provided to control the operation of the pump 166 such that the pump flow rate is increased as necessary to stop the temperature of the condensate 156 exceeding a predetermined threshold.

The second vessel 160 has a heat exchange pipe 190 provided therein such that water from a cold main may pass through the pipe 190 and from there to the inlet of the boiler 154. A blending valve 192 may be provided so as to control the water temperature at the inlet of the boiler 154.

Depending on the usage and installation of the boiler, the pipe 190 may be connected in series with a domestic heating return line (i.e. as part of a space heating system) rather than as part of a water heating system. Similarly the heat exchanger 190 need not lead to the blending valve 192 but alternatively might be connected directly to the boiler 154 or may lead to a further water storage vessel.

In alternative embodiments the internal weir 158 may be dispensed with an replaced by an outlet formed at a suitable height in the wall of the first vessel 152.

The heat exchanger 168 may be a plate heat exchanger, for example of the type shown in FIG. 5. Alternatively water from the pump could be allowed to run over the uppermost surface of the heat exchanger while the lower surface is exposed to the flue gas. The heat exchanger 168 may be positioned as shown in the Figure such that any condensate forming on its lower surface can fall down the surface and drop into the reservoir within the first vessel 152.

The other embodiments shown with respect to FIGS. 1, 2 and 4 could also be used as the first part 150 of this distributed system provided that condensate outlet and return paths were attached to them.

Advantageously a temperature operated pressure release valve 200 is provided to vent the second vessel 163 to atmosphere in the event that the temperature therein exceeds the predetermined value, for example 90° or so. Similarly the pump 166 may be inhibited if the temperature in the vessel 163 exceeds a safe value so as to avoid the possibility of the water within the heat exchanger 190 turning to steam. However it will be seen that the pressure release valve 200 need not be mandatory since the vessel 163 can also vent via its connection to the downstream side 162 of the weir 158 since this is substantially at atmospheric pressure.

Figure 9:
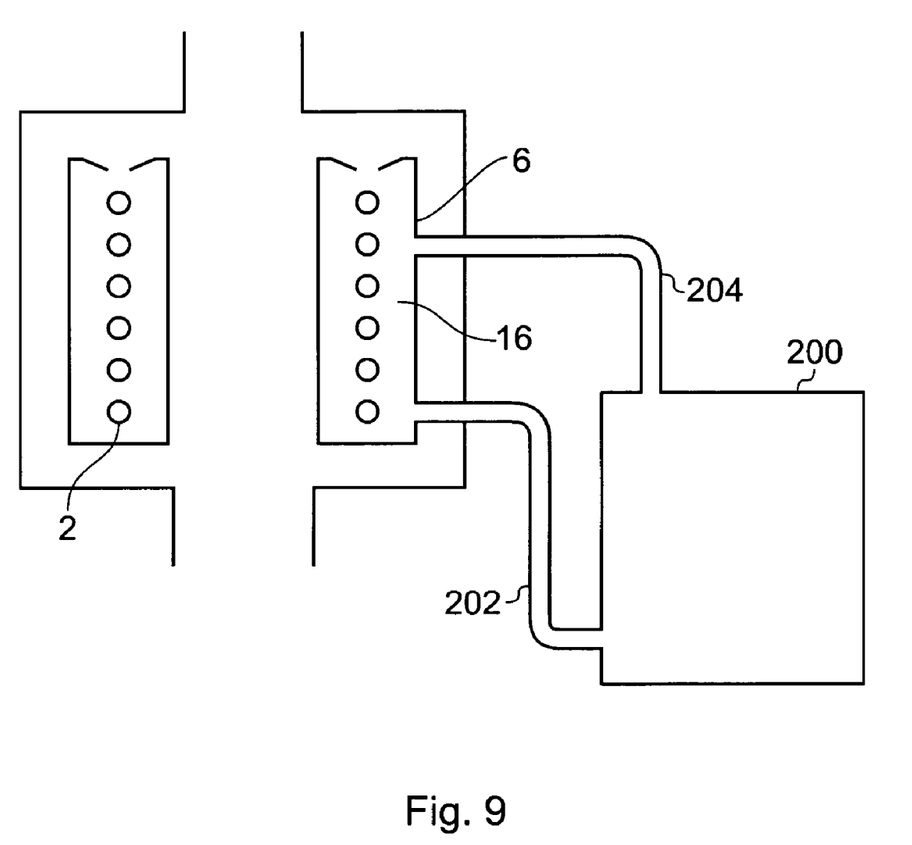
FIG. 9 shows a heat exchanger including a solar collector.

In a further modification, which can be applied to any of the embodiments described hereinbefore, a solar collector 200 may be connected to the vessel 6 storing the condensate. The solar collector can be mounted on the external wall of the dwelling so as to capture thermal energy from the sun and to deliver that energy into the condensate/water 16 of the thermal store. The solar collector 200 may be in the form of a serpentine pipe within a solar panel or may simply be a dark coloured vessel or bag which itself is filled with water. As schematically shown in FIG. 9, the solar collector 200 has a first connection 202 between a lower portion of the thermal store 6 and a lower portion of the collector 200, and a second connection 204 between an upper portion of the thermal store 6 and an upper portion of the collector 200. As a consequence a gravity fed water circulation can be established between the collector 200 and thermal store 6. This has the advantage that liquid exchange between the collector 200 and the store 6 only occurs when the water in the uppermost portion of the collector 200 has been warmed sufficiently to initiate the gravity fed circulation. Similarly, circulation does not occur when the water in the collector is cold, for example during winter.

The use of a solar collector 200 enhances the ability of the water in the thermal store 6 to be warmed during summer when it is most unlikely that the boiler will be operating in central heating mode. The solar collector 200 need not be very big and still enables useful energy to be delivered into the store of condensate such that, when hot water is demanded from the boiler an initial temperature rise can be imparted to water from the cold main that is fed into the boiler.

It is thus possible to recover significant useful energy from the flue gas using a simple and robust heat exchanger.

What is claimed is:

1. A heat exchanger comprising:
   gas flow path means for defining a flow path for flue gases from a boiler;
   liquid flow path means for defining a flow path for a liquid through the heat exchanger; and
   a heat transfer device for transferring heat from the gas in the gas flow path means to the liquid in the liquid flow path means;
   wherein the heat transfer device functions as a thermal store and comprises a vessel located in the flow path of the flue gases, the vessel containing water, and condensate from the flue gas can enter the vessel to replenish the water contained in the vessel.

2. A heat exchanger as claimed in claim 1, in which the vessel has an upper portion profiled so as to form a surface on which condensate can collect and having apertures (41) therein to enable the condensate to flow into the interior of the vessel.

3. A heat exchanger as claimed in claim 1, in which the vessel has apertures formed in walls of the vessel so as to allow the maximum volume of water within the vessel to be defined.

4. A heat exchanger as claimed in claim 1, in which the vessel has at least one surface which either defines part of the gas flow path means or is in intimate contact with it.

5. A heat exchanger as claimed in claim 1, in which the vessel is a double walled vessel having an inner wall which defines a channel that is open at both ends and through which flue gas can pass.

6. A heat exchanger as claimed in claim 5, in which the vessel has an outer wall, and the space between the inner and outer walls contains water.

7. A heat exchanger as claimed in claim 6, in which the liquid flow path means comprises a helical pipe (4) disposed within the vessel.

8. A heat exchanger as claimed in claim 7, further including a final stage heat exchanger positioned so receive flue gas from the boiler, the final stage exchanger being positioned either, in flue gas flow terms, in parallel with or before the thermal store.

9. A heat exchanger as claimed in claim 6, in which flue gases pass over the inner and outer walls of the vessel.

10. A heat exchanger as claimed in claim 5, further including a reservoir of water, the reservoir being disposed within the gas flow path and adjacent the inner wall of the vessel.

11. A heat exchanger as claimed in claim 1, in which a further heat exchanger is provided, the further heat exchanger being arranged to be in the path of the flue gas downstream of the first thermal store.

12. A heat exchanger as claimed in claim 11, in which the further heat exchanger is connected to the cold water flow upstream of heat exchanger formed within the thermal store.

13. A heat exchanger as claimed in claim 1, in which a secondary thermal store is provided.

14. A heat exchanger as claimed in claim 1, in which the heat exchanger is distributed into a first vessel and a second vessel, and wherein condensate can be exchanged between the first vessel and the second vessel.

15. A heat exchanger as claimed in claim 14, in which the first vessel has a means for defining a volume of liquid therein, and excess liquid is drained into the second vessel.

16. A heat exchanger as claimed in claim 14, further including a pump for pumping liquid from the second vessel to the first vessel.

17. A heat exchanger as claimed in claim 16, in which the pump is controlled in response to the temperature of the liquid in the first vessel.

18. A heat exchanger as claimed in claim 14, further including a heat exchange element in contact with the flue gasses for warming the liquid prior to admitting it into a store within the first vessel.

19. A heat exchanger as claimed in claim 1, further comprising a solar collector for warming the water in the vessel of the heat transfer means.

20. A boiler in combination with a heat exchanger as defined in claim 1.

21. A combination of a boiler and a heat exchanger, wherein the boiler has a maximum power output and flue gases from the boiler pass through a heat exchanger having a heat transfer device for transferring heat from the flue gases to a liquid in a liquid flow path, and where the heat transfer device functions as a thermal store and has a heat capacity equivalent to 0.25 to 1 liter of water per kilo-watt hour of boiler output, and further including a mixer for mixing warmed water from a water main such that a cold water feed to the boiler is at a temperature intermediate a cold main temperature and the water temperature from the heat exchanger.

22. A combination of a boiler and heat exchanger as claimed in claim 21, in which the thermal store comprises a vessel containing water and condensate from the flue gas can enter the vessel.

23. A combination of a boiler and a heat exchanger as claimed in claim 22, in which an upper portion of the vessel is profiled so as to form a surface on which condensate can be collected, and has apertures therein to enable to condensate to flow into the interior of the vessel.

24. A combination of a boiler and a heat exchanger as claimed in claim 22, in which the condensate replenishes the water level in the vessel.

25. A boiler in combination with a heat exchanger as claimed in claim 21, in which water leaving the mixer is below 30° C.

26. A combination of a domestic boiler and a heat exchanger, wherein flue gasses from the boiler pass through a heat exchanger having a heat transfer means for transferring heat from the flue gas to a liquid in a liquid flow path, wherein the heat transfer means forms a thermal store having a heat capacity sized such that the store heats to its maximum temperature substantially in ½ to one hour, and further including a mixer for mixing warmed water from a water main such that a cold water feed to the boiler is at a temperature intermediate a cold main temperature and the water temperature from the heat exchanger.

27. A heat exchanger comprising:
gas flow path means for defining a flow path for flue gases from a boiler;
liquid flow path means for defining a flow path for a liquid through the heat exchanger; and
heat transfer means for transferring heat from the gas in the gas flow path means to the liquid in the liquid flow path means;
wherein the heat transfer means functions as a thermal store and comprises a vessel containing water and having an upper portion profiled so as to form a surface on which condensate can collect and having apertures therein to enable the condensate to flow into the interior of the vessel such that condensate from the flue gas can enter the vessel to replenish the water contained in the vessel.

28. A combination of a boiler and a heat exchanger, the heat exchanger comprising:
a channel for defining a gas flow path for flue gasses from the boiler;
a pipe for defining a flow path for a liquid through the heat exchanger; and
a heat transfer device for transferring heat from the gas in the gas flow path to the liquid in the liquid flow path;
wherein the heat transfer device functions as a thermal store and comprises a vessel located in the flow path of the flue gasses, the vessel containing condensate from the flue gas, and condensate from the flue gas can enter the vessel to replenish the condensate therein.

29. A combination of a boiler and a heat exchanger as claimed in claim 28, wherein the thermal store is sized such that it heats up to at least 60° C. in half an hour.

* * * * *